Patented Feb. 8, 1944

2,341,262

UNITED STATES PATENT OFFICE 2,341,262

PRIMING COMPOSITION

Willi Brün and Gordon M. Calhoun, Bridgeport, Conn., assignors to Remington Arms Company, Inc., a corporation of Delaware No Drawing. Application July 26, 1941,
Serial No. 404,140

10 Claims. (Cl. 52—4)

This invention relates to the manufacture of ammunition, and comprehends the discovery that the incorporation of polyvinyl alcohol in wet priming mixtures gives improved results in charging operations, and prevents mass detonation during the handling of ammunition components containing the same.

When wet priming mixtures are charged into rim-fire shells, it is desirable that the composition be in the form of a paste having a consistency and adhesive properties which will cause it to properly adhere to the metal of the shell. Since the conventional ingredients of such compositions are of crystalline character and do not absorb moisture in appreciable quantities, loaders sometimes resort to the expedient of incorporating a water soluble bodying agent. The materials heretofore employed for this purpose attract moisture and retain it, particularly in atmospheres of high humidity. For this reason the use of this scheme has been somewhat limited, since it causes the deterioration of certain types of priming mixtures, particularly those containing lead nitrate, lead hypophosphite, lead nitrato-hypophosphite, and the like, by inducing an interaction between the oxidizing and reducing ingredients.

It is essential, to quantity production, that rim fire shells, after the priming mixture has been placed therein, be handled (tumbled, etc.) rather roughly in lots of many thousands. Under these circumstances individual priming charges are apt to explode, causing a considerable number of other units to also explode and violently disperse the entire lot. This phenomena, which is not very well understood, is frequently referred to as "mass detonation."

It has now been found that polyvinyl alcohol has the unforeseen and unexpected quality of inhibiting "mass detonation," and in addition, is an almost ideal binder for wet priming mixtures because it does not readily take up moisture after the water has been evaporated from the wet priming charge.

Typical compositions embodying the present invention, and in which the percentages are given by weight, are as follows:

| | Examples | | | | | | | | |
|---|---|---|---|---|---|---|---|---|---|
| | I | II | III | IV | V | VI | VII | VIII | IX |
| Lead styphnate | 50 | | 30 | 33 | 30 | 30 | 38 | 20 | 27 |
| Tetrazene | 2 | | | | | | 2 | | 3 |
| Mercury fulminate | | 50 | | | | | | 20 | |
| Lead hypophosphite | | | 15 | 10 | 20 | 10 | | | |
| Lead nitrate | 20 | | 25 | 12 | 10 | 12 | | | 40 |
| Barium nitrate | | 20 | | 10 | 20 | 18 | 39 | 33 | |
| Lead dioxide | | | | 5 | | | 5 | | |
| Antimony sulfide | | | | | | | 5 | 12 | 14 |
| Calcium silicide | | | | | | | 11 | 15 | 7 |
| Lead sulfocyanate | 8 | 10 | | | | | | | 9 |
| Glass | 20 | 20 | 30 | 20 | 20 | 30 | | | |
| Polyvinyl alcohol | .2 | .2 | .2 | .2 | .2 | .2 | .2 | .2 | .2 |

The term "polyvinyl alcohol" is used in the specification and claims to designate a product having a sufficient number of unsubstituted hydroxyl radicals (groups, residues, nuclei) to bring about water solubility. This includes products such as that disclosed in U. S. A. Patent No. 2,111,272 (Paulson), wherein all or substantially all of the hydroxyl groups are free, and products of the character described in U. S. A. Patent No. 2,226,075 (Rowe) in which some of the hydroxyl groups are substituted (have been reacted) to produce esters, ethers, acetals, etc.

Polyvinyl alcohol is usually obtained by the hydrolysis of polymerized vinyl esters, such as polyvinyl acetate, as indicated in U. S. A. Patent No. 2,176,903 (Izard). Water solubility is obtained when about 70% to 80% of the ester groups have been saponified. Although materials with a saponification number of 300, corresponding to approximately 30% acetylation, have been used successfully, material with a saponification number of 8 to 10, corresponding to approximately 1% of esterification, is preferred. A completely saponified (pure polyvinyl alcohol) product, which has been reacted with aldehydes to form acetal groups, retains its water solubility until up to about 9% of its hydroxyl groups have been substituted. It follows that the polyvinyl alcohol molecule may be substituted with different proportions and with one or more kinds of substituents and still be water soluble.

The more highly polymerized water soluble polyvinyl alcohols have higher viscosities than the lower polymers for the same aqueous solution concentration. The material preferred for this invention is a medium viscosity product having a molecular weight in the range 7500–9500, but products falling within the range 12,000–21,000 are valuable and useful. While a product whose 4% aqueous solution gives a viscosity, at 20° C., of 20 to 25 centipoises (Hoeppler viscosimeter) is most desirable, results with materials giving viscosities 4 to 60 under the same conditions have been used successfully. The mention of molecular weights is made primarily for aiding and understanding the invention. Data of this character is accurate according to present standards, but is obtained indirectly, and it is not, therefore, desired to restrict the invention to figures, the reliability of which, in view of later knowledge, may be questionable.

The quantity of polyvinyl alcohol employed with the usual priming mixtures is preferably about 0.2% (based on the weight of the priming composition), of a product with a viscosity of 20–25 centipoises at 20. C. and a saponification of 8.10. Slightly higher amounts, up to 0.5%, are usually necessary with other polyvinyl alcohols. The presence of 1% will completely inhibit the tendency to mass detonate in mixtures which, in spite of desirable ignition and sensitivity characteristics, are unsafe to use in mass production, due to the high content of initiating explosives. The range of 0.1% to 1.0% of polyvinyl alcohol has been found to be suitable for most priming mixtures and most polyvinyl alcohols.

The sensitivity of polyvinyl alcohol to moisture pick-up can be lessened to a remarkable extent by treatment with ingredients which tend to solubilize it. Materials suitable for this purpose include various inorganic compounds such as borates, perborates, silicates, chromates, dichromates, chromic acid, ferric chloride, alum, etc., and organic hardening agents such as tannins, aldehydes, for example formaldehyde, and formaldehyde derivatives, for example hexamethylenetetramine, monomethanol urea, dimethylol urea, trimethylol melamine, etc., linseed oil, azo dyes, and the like.

The polyvinyl alcohol may be added to the priming composition either in the dry state or in the form of an aqueous solution.

The invention is not limited to rim-fire ammunition. It can also be used advantageously in priming mixtures for center-fire cartridges and shot gun shells.

The present invention is especially advantageous when employed with lead nitrato-hypophosphite formulations, that is, mixtures containing lead hypophosphite and lead nitrate which react to form the nitrato-hypophosphite when wet to facilitate positioning in the shell.

The advantages of using polyvinyl alcohol in priming mixtures include, inter alia, the ability to dissolve in hot water to form a gum-like solution which can be employed in the same manner as conventional colloidal binders such as gum tragacanth and starch ethers, and yet not readily take up moisture after the water has been evaporated from the priming mixture in the shell, and the ability to prevent mass detonation in conventional priming mixtures and in priming mixtures too hazardous to be utilized on a commercial scale because of the high total explosive content (between 35% and 60% of the priming mixture, depending upon the nature of the initiating explosives and the oxidizing ingredients).

Priming mixtures containing polyvinyl alcohol being broadly new, the appended claims are to be broadly construed.

We claim:

1. A priming mixture for ammunition containing polyvinyl alcohol as a mass detonation inhibitor.

2. An ignition mixture containing approximately:

| | Parts |
|---|---|
| Lead styphnate | 30.0 |
| Lead hypophosphite | 20.0 |
| Lead nitrate | 10.0 |
| Barium nitrate | 20.0 |
| Glass | 20.0 |
| Polyvinyl alcohol | 0.2 |

3. An ignition mixture containing polyvinyl alcohol in a quantity not greater than 0.2%.

4. An ignition mixture containing 0.1% to 1.0% of polyvinyl alcohol.

5. A rim fire priming mixture comprising a binder, said binder being water soluble polyvinyl alcohol.

6. A rim fire priming mixture comprising a binder, said binder being water soluble polyvinyl alcohol which, in 4% aqueous solution at 20° C., has a viscosity in the range 4 to 60.

7. A rim fire priming mixture comprising a binder, said binder being water soluble polyvinyl alcohol which, in 4% aqueous solution at 20° C., has a viscosity in the range 20 to 25.

8. A rim fire priming mixture comprising lead nitrato-hypo-phosphite and a binder, said binder being water soluble polyvinyl alcohol.

9. A rim fire priming mixture comprising lead nitrato-hypo-phosphite and a binder, said binder being water soluble polyvinyl alcohol which, in 4% aqueous solution at 20° C., has a viscosity in the range 4 to 60.

10. A rim fire priming mixture comprising lead nitrato-hypo-phosphite and a binder, said binder being water soluble polyvinyl alcohol which, in 4% aqueous solution at 20° C., has a viscosity in the range 20 to 25.

WILLI BRÜN.
GORDON M. CALHOUN.

CERTIFICATE OF CORRECTION.

Patent No. 2,341,262. February 8, 1944.

WILLI BRÜN, ET AL.

It is hereby certified that error appears in the printed specification of the above numbered patent requiring correction as follows: Page 2, first column, line 31, for "20. C." read --20° C.--; line 32, for "8.10" read --8-10--; and that the said Letters Patent should be read with this correction therein that the same may conform to the record of the case in the Patent Office.

Signed and sealed this 18th day of April, A. D. 1944.

(Seal)

Leslie Frazer
Acting Commissioner of Patents.